United States Patent

Buxbaum

[11] Patent Number: 5,931,987
[45] Date of Patent: Aug. 3, 1999

[54] APPARATUS AND METHODS FOR GAS EXTRACTION

[76] Inventor: Robert E. Buxbaum, 25451 Gardner, Oak Park, Mich. 48237

[21] Appl. No.: 08/875,046

[22] PCT Filed: Nov. 6, 1996

[86] PCT No.: PCT/US96/18131

§ 371 Date: Sep. 11, 1997

§ 102(e) Date: Sep. 11, 1997

[87] PCT Pub. No.: WO97/17125

PCT Pub. Date: May 15, 1997

[51] Int. Cl.$^6$ ............................. B01D 53/22; B01D 71/02
[52] U.S. Cl. .......................... 95/55; 95/53; 95/56; 96/11; 55/524
[58] Field of Search .................... 95/45, 53, 55, 95/56; 96/4, 7, 8, 10–12; 55/524, DIG. 5

[56] References Cited

U.S. PATENT DOCUMENTS

| | | | |
|---|---|---|---|
| 2,958,391 | 11/1960 | deRosset | 96/11 X |
| 3,241,293 | 3/1966 | Pfefferle | 95/56 |
| 3,241,298 | 3/1966 | Pierce | 96/11 X |
| 3,344,582 | 10/1967 | Merrill et al. | 95/56 |
| 3,350,846 | 11/1967 | Makrides et al. | 95/56 |
| 3,368,329 | 2/1968 | Eguchi et al. | 96/8 |
| 3,410,058 | 11/1968 | Oswin | 96/7 |
| 4,313,013 | 1/1982 | Harris | 95/56 X |
| 4,427,424 | 1/1984 | Charpin et al. | 96/8 |
| 4,468,235 | 8/1994 | Hill | 95/56 X |
| 4,496,373 | 1/1985 | Behr et al. | 95/56 X |
| 4,536,196 | 8/1985 | Harris | 95/56 X |
| 4,810,485 | 3/1989 | Marianowski et al. | 95/56 X |
| 4,986,837 | 1/1991 | Shibata | 96/8 X |
| 5,181,941 | 1/1993 | Najjar et al. | 95/56 X |
| 5,205,841 | 4/1993 | Vaiman | 95/56 X |
| 5,215,729 | 6/1993 | Buxbaum | 95/56 X |
| 5,358,553 | 10/1994 | Najjar et al. | 95/56 X |
| 5,498,278 | 3/1996 | Edlund | 95/56 X |
| 5,518,530 | 5/1996 | Sakai et al. | 95/56 X |

OTHER PUBLICATIONS

Booth, J.C.S., Doyle, M.L., Gee, S.M., Miller, J., Scholtz, L-A., and Walker, P.A., "Advanced Hydrogen Separation Via Thin Supported Pd Membranes", Hydrogen Energy Progress XI, vol. 1, pp. 867–878 (No Date).

*Primary Examiner*—Robert Spitzer
*Attorney, Agent, or Firm*—Gifford, Krass, Groh, Sprinkle, Anderson & Citkowski, P.C.

[57] ABSTRACT

An apparatus (5) and methods for extracting a gas, especially hydrogen, from a fluid stream includes a pressure vessel (12) having an inlet (22) and at least one outlet (26) for allowing fluid flow therethrough. A plurality of extraction membranes (14) are axially disposed in pressure vessel (12). Extraction membranes (14) are selected from cylindrical or approximately cylindrical tubular metal substrate membranes and ceramic or polymeric substrate membranes. Enhanced mass transfer during the extracting is achieved by reducing the diameter and separation barrier thickness of extraction membranes (14) by adding bumps (18), curves, or packing (19). Extraction membranes (14) have inner and/or outer layers of palladium, platinum, rhodium or palladium alloys having greater hydrogen separation surface properties than a core membrane.

28 Claims, 6 Drawing Sheets

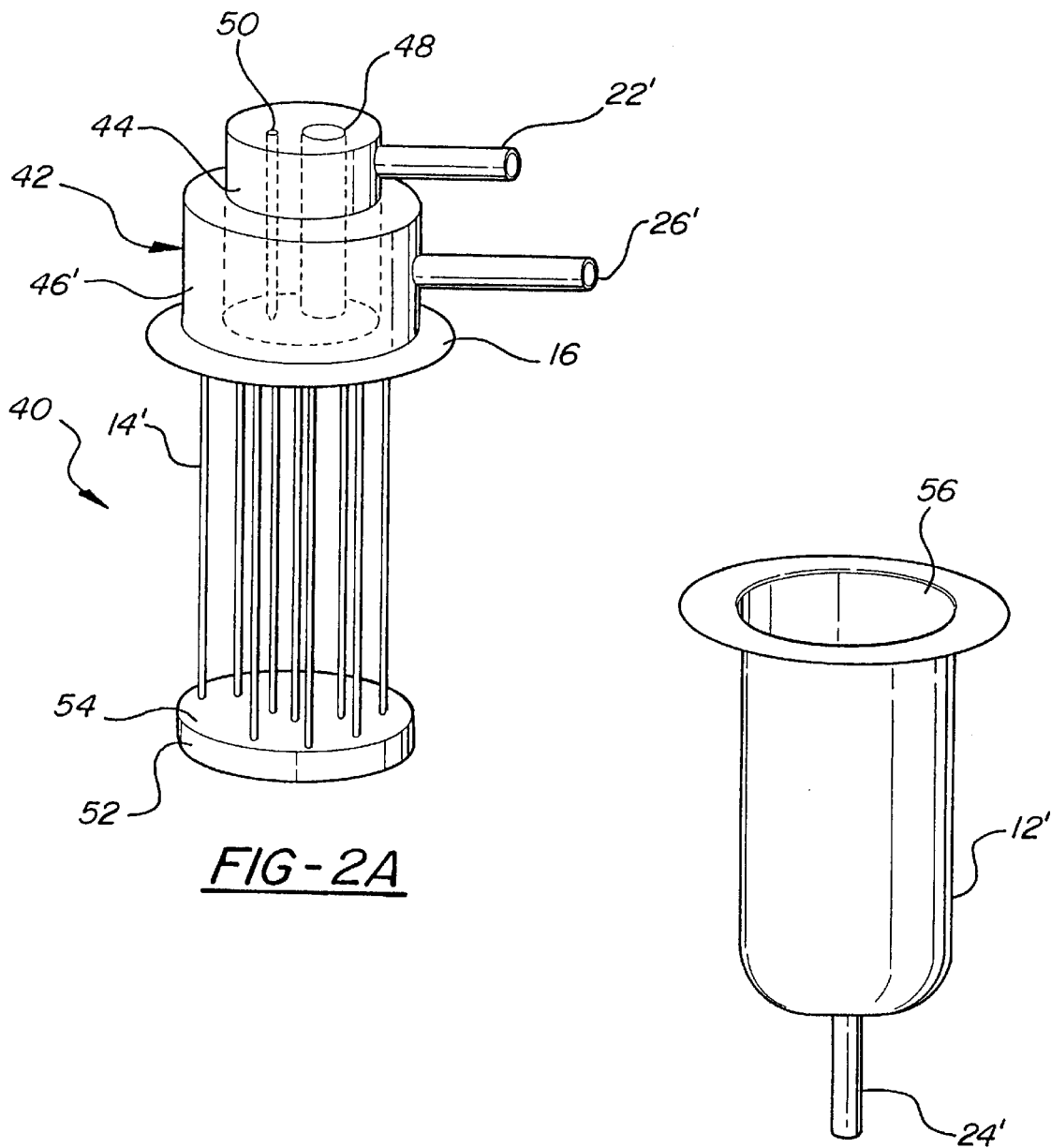
FIG-2A
FIG-2B
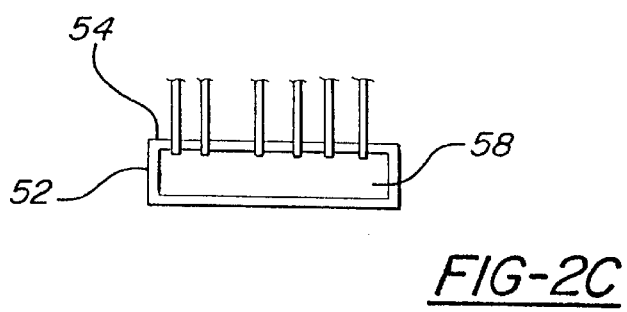
FIG-2C

APPARATUS AND METHODS FOR GAS EXTRACTION

TECHNICAL FIELD

The present invention relates to separation and purification of a gas from a fluid mixture. More particularly, the present invention relates to a membrane gas extraction module for removing preferably hydrogen from a fluid mixture.

BACKGROUND OF THE INVENTION

A common technology for extracting pure hydrogen from industrial streams, such as for hydrogenation for changing the balance of hydrogen in those streams or to increase reaction selectivity, is to use membranes of palladium or palladium alloys alone or supported structurally by a matrix. Membranes which contain thick enough palladium layers to be made without holes and not break during service tend to be expensive and have relatively high resistance to hydrogen permeation.

Several membrane variations and module designs have been proposed to minimize this effect. Membranes can include porous ceramics either by themselves or coated with palladium alloys or with silica and palladium coated refractory metals and alloys, especially those based on Nb, V, Ta, Ti, Zr. These have greater strength than palladium and palladium-based alloys, are cheaper per unit volume, and most have greater intrinsic permeabilities to hydrogen. Although the alternatives are less expensive than Pd, they are not less expensive compared to polymers. Thus, with all of these membranes more attention must be directed to module designs that make efficient use of the membrane surface and provide a high recovery percentage without undue gas-phase mass transfer resistance. To date, no commercial module has been described that is particularly efficient for large scale hydrogen extraction using any of these membranes.

An example of an apparatus for hydrogen separation is disclosed in U.S. Pat. No. 4,468,235 to Hill (Hill '235). The Hill '235 patent discloses an apparatus for separating hydrogen from fluids and includes, mounted axially in a cylindrical pressure vessel, a plurality of membranes in the form of tubes coated on either the inside or the outside or both sides with coatings having a high permeability to hydrogen. There is also a fluid flow inlet and a raffinate flow outlet and a header to collect hydrogen. No sizes or criticalities are disclosed for the extraction membrane. Additionally, since this design provides no mechanism for flow distribution or turbulence generation, the separation efficiency of this apparatus is not maximized.

Another example of a similar apparatus for hydrogen extraction is disclosed in U.S. Pat. No. 5,205,841 to Vaiman (Vaiman '841) issued Apr. 27, 1993. The Vaiman '841 patent discloses an apparatus for separating hydrogen from gas and gas liquid mixtures at low temperature. The Vaiman '841 apparatus includes a plurality of axially mounted tubes coated on both their inside and outside surfaces with palladium/platinum black. There is also a fluid flow inlet and a raffinate flow outlet and a header to collect hydrogen. Vailman '841 does not teach any sizes or criticalities for the extraction membrane or its arrangement within the structure. Additionally, as similarly stated above regarding the Hill patent, the Vaiman '841 design provides no mechanism for flow distribution or turbulence generation. Separation efficiency of this apparatus is not maximized.

Another typical design for large hydrogen extractors uses tubular membranes of palladium-silver alloy in spiral form. This tubing generally has an outer diameter of 0.0625 to 0.125 inches and wall thickness of approximately 0.003 inches. For the smaller diameter tubes, the source hydrogen flows over the outside of several wound helixs made from 10 to 15 feet of tubing. These, hydrogen extractors typically require complex expensive construction that limits heat and mass transport. Also, since pressure drops become excessive when the tube length exceeds about twenty-five feet large modules end up with 40 or more nested and stacked helixes that must be hand assembled in a large tubular bundle without damaging any single one of the delicate tubes. This is a delicate construction process by any standard.

Large diameter tubes avoid maldistribution and assembly problems by driving all of the flow through a single tube. The practical limit is reached at about 100 feet. Longer lengths lead to destructive harmonic vibrations, especially during start-up and shut-down. Also, since module size increases with the square of the tube diameter, such units have had to be too big to cite comfortably. Further, temperature uniformity is even harder to maintain than with $\frac{1}{16}$ inch units.

The spiral type designs are particularly difficult to form when dealing with coated refractory metals or with ceramics, as these materials are more brittle than palladium and coated membranes require more gentle handling than homogenous palladium alloys. The spiral type designs inherently have problems with scraping of the membrane surfaces and with kinking of the tubing material during manufacture thereby leading to inherent weaknesses in the tubes which are utilized under pressure. For large scale applications, these spiral-type hydrogen extractors tend to be larger in overall size than the module of the present invention thereby adding to the cost of the structure, sitting, shipping, maintenance, manufacture, and making them unpleasant to the eye.

To date, modules based on tubular ceramics or ceramic-based membranes known are based on a single pair of concentric tubes. The diameter of the ceramic membranes is approximately 0.375". Such designs cannot be readily scaled up for commercial applications.

The present invention provides a hydrogen extraction module which eliminates the spiral-type extraction membranes and is much more simple to construct, more compact, and can be more easily constructed from difficult materials, such as ceramics, and from high diameter to wall ratio metal tubes.

The present invention also provides improved hydrogen recovery from relatively impure mixtures through the use of critically sized extraction membranes and turbulence generating bumps or packing.

Another approach to the problems of palladium based membranes recognizes that the specific alloys are chosen by a trade-off between cycling stability, ease of drawing, high permeance, lower volumetric cost, and relatively good surface properties. Currently, the single material that most closely meets all of these criteria are made from palladium-silver alloys containing 23 to 25% silver. These tubes typically do trade off moderate cycling stability. They typically do not break for about two years in operation and have moderate drawability against their relatively high expensive and high resistance to hydrogen permeation, especially at temperatures below 300° C. and for gas streams containing sulfur, carbon monoxide, and olefins.

Several options to palladium-silver membranes have been suggested, but are not in common use. For example, the U.S. Pat. No. 1,292,025 to Darling discloses a membrane requiring porous or discontinuous palladium coat over a base of refractory metal Nb, V, or Ta. The U.S. Pat. No. 4,496,373 to Bohr et al. discloses alloying the palladium layer with silver, calcium or yttrium. The patent also requires an intermediate melt layer. The U.S. Pat. No. 4,536,196 to Harris discloses essentially a palladium membrane which is coated with various metals as poisons to prevent the fouling of the palladium surface. Under some circumstances, this poisoning can be advantageous to the surface properties of the membrane, but the high cost and low reliability of palladium remains. The U.S. Pat. No. 4,313,013 to Harris shows similar palladium membranes that have been in use.

The U.S. Pat. No. 3,350,846 to Makrides et al. discloses a process of purification of hydrogen by diffusion through a very thin membrane of palladium coated Group V-B metal.

The U.S. Pat. No. 5,215,729 ('729) issued Jun. 1, 1993, to the inventor of the present application and incorporated herein by reference teaches membranes which combine the strength and high permeation of refractory metals with a coating of palladium or palladium alloys to improve the surface properties of the membranes. As with single-layer palladium alloys, selectivity is essentially 100% for hydrogen extracted. Applicant has observed that some of the best refractory metals can be difficult to fabricate into tubes or modules. Applicant has further observed that the surface properties of some of these membranes was often far better than those of single layer palladium-silver, especially at low temperatures and in the presence of carbon monoxide, hydrogen sulfide, and olefins..

In view of the above, a further object of the present invention is to improve on the properties of palladium-silver and similar alloys by adding a coating of palladium or similar materials to improve the surface properties. The resulting membranes have good strength, ease of fabrication, good durability, relatively, low resistance to hydrogen even at low temperatures, improved resistance to carbon monoxide, $H_2S$ and olefins, fair resistance to embrittlement, and a hydrogen selectivity that can exceed that for palladium-silver because the operating temperature is lower.

SUMMARY OF THE INVENTION AND ADVANTAGES

In accordance with the present invention, there is provided an apparatus for extracting hydrogen from fluid streams containing hydrogen. The apparatus includes a housing and at least one extraction membrane in the form of a tube axially disposed in the housing for extracting hydrogen from the fluid flowing therethrough. The extraction membranes have a wall thickness to the tube diameter ratio of 1:40.

There is further provided a membrane for extracting hydrogen from fluid streams containing hydrogen. The membrane consists essentially of a first layer of Pd—Ag or Pd—Cu alloy or combination thereof permeable to hydrogen, the first layer having a first and second surface. A second layer coated over at least one of the surfaces of the second layer consisting essentially of palladium, platinum, rhodium, and palladium alloys.

BRIEF DESCRIPTION OF THE DRAWINGS

Other advantages of the present invention will be readily appreciated as the same becomes better understood by reference to the following detailed description when considered in connection with the accompanying drawings wherein:

FIGS. 2A and 2B are exploded perspective views of two "pressure-inside" embodiments of the present invention;

DETAILED DESCRIPTION OF THE INVENTION

Figure 1A:
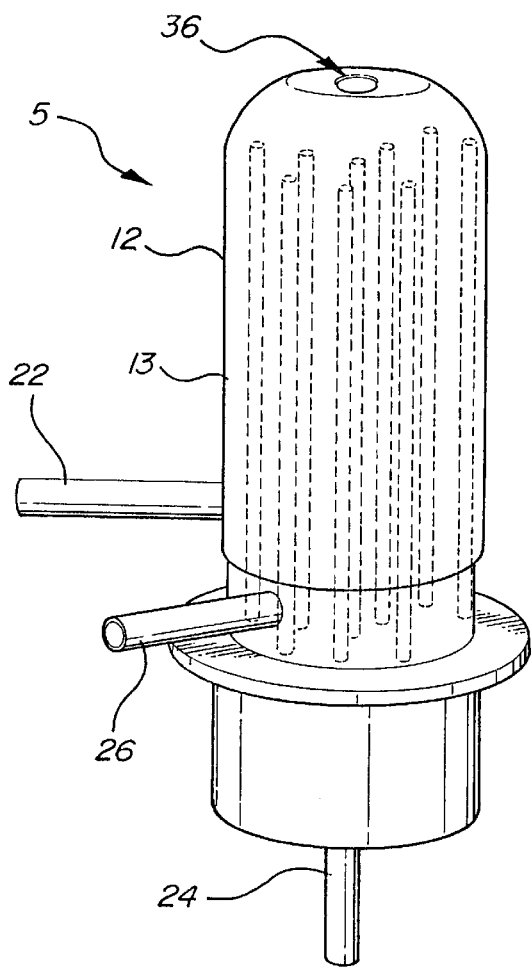
FIGS. 1A and 1B are exploded perspective views of a "pressure-outside" embodiment of the present invention.

An apparatus for extracting hydrogen from fluid streams containing hydrogen is generally shown at 5 in FIG. 1A. The Figure schematically shows a membrane system for removing hydrogen from a fluid. Mounted in a pressure vessel 12 are a plurality of membranes in the form of tubes 14. The tubes 14 are operatively connected at one end to a header 16 and the other end of the tubes 14 are either capped or can be operatively attached to a floating head 52 as shown in FIG. 2A and discussed in greater detail below. Attachment of the tubes 14 to the header 16 and the header 16 to the pressure vessel 12 can be accomplished by welding, soldering, brazing, by using a high temperature inorganic glue or by methods well known by those skilled in the art.

FIGS. 1A and B illustrate an embodiment of the present invention referred to as a "pressure-outside" design. In this embodiment, the inlet flow of fluid containing a mixed gas includes hydrogen flowing outside of and over the outer surface of the tubes 14. A tube cap is indicated at 15. The pressure vessel 12 includes an inlet 22 which defines a passageway for the introduction of the fluid stream containing hydrogen into the vessel 12. The pressure vessel 12 further includes a passageway disposed in fluid communication with an outlet 26. An additional outlet 24 is disposed in fluid communication with the header 16 to allow for the exit of pure extracted hydrogen from the apparatus 5. The outlet 26, disposed in fluid communication with the pressure vessel 12, is provided to allow the exit of raffinate or to allow the fluid having had some of the hydrogen removed to exit the pressure vessel 12.

The fluid enters the inlet 22 under a positive pressure. The pressure head can range from about 0 to 600 psi. The pressure head is preferably between 80 and 250 psi. Such a pressure head would normally tend to induce collapses of the tubular membranes unless certain structural conditions are met, as discussed below. It should be noted that these ranges are not meant to be limiting as the pressure head is dependent upon the membrane of choice.

The tubes 14 which comprise the hydrogen extraction membrane can include at least one straight or substantially straight axially aligned tube having an outer diameter ranging, for a metal substrate membrane, from approximately 0.007 inches to 0.100 inches and having a permeation barrier thickness ranging from approximately 0.0002 inches to approximately 0.002 inches. A ceramic or polymeric substrate membrane can include tubes having an outer diameter ranging from approximately 0.010 inches to 0.300 inches and having a permeation barrier thickness ranging from approximately 0.000002 inches to 0.001 inches. These ranges of outer diameters and permeation barrier thicknesses provide an optimal balance of strength, flux, and low cost of construction.

Most preferably, for metal membranes, the ratio of the wall thickness to tube diameter is approximately 1:40. For most metal substrate, this provides a membrane which is thick enough to withstand 250 psi and 350° C. without tube collapse, but is not significantly thicker. The membrane thus maximizes permeation efficiency under a broad range of temperatures and pressures popularly utilized by those skilled in the art.

Generally, in a non-porous metallic membrane, the permeation barrier thickness will equal the wall thickness, and in a porous or porous supported membrane, the permeation barrier will be much smaller than the wall thickness.

With non-porous, metallic membranes, using small diameter tubes 14 for the hydrogen extraction module 5 of the present invention allows more surface area of membrane to be packed into a given module volume and allows the use of thinner wall tubes for both "pressure-outside" and "pressure-inside" designs. Further, thinner wall tubes involve less material cost than thick walled tubes and generally have higher flux as well.

The transport resistance in the tube wall generally increases in proportion to the wall thickness increases. Similarly, except for the design modifications specified in the present application, transport resistance in the stagnant gas layer next to the wall tends to increase in rough proportion to the tube diameter. This is particularly apparent in a pressure inside design such as that shown in FIG. 2A where the tubes are long and the gas flow is laminar. For such designs, the mass transport resistance is approximately that of a region of stagnant gas ⅓ as thick as the tube diameter. The amount of this resistance then decreases in direct proportion to the tube diameter.

The same advantages of small diameters also apply to pressure outside designs where the flow is turbulent and crosswise, or laminar flowing axially in the small space between the tubes. As set forth above, without the current invention, a turbulence inducing means, the stagnant gas layer thickness again decreases as the tube diameter decreases. Hence, the flux increases with decreasing tube diameters.

Figure 1B:
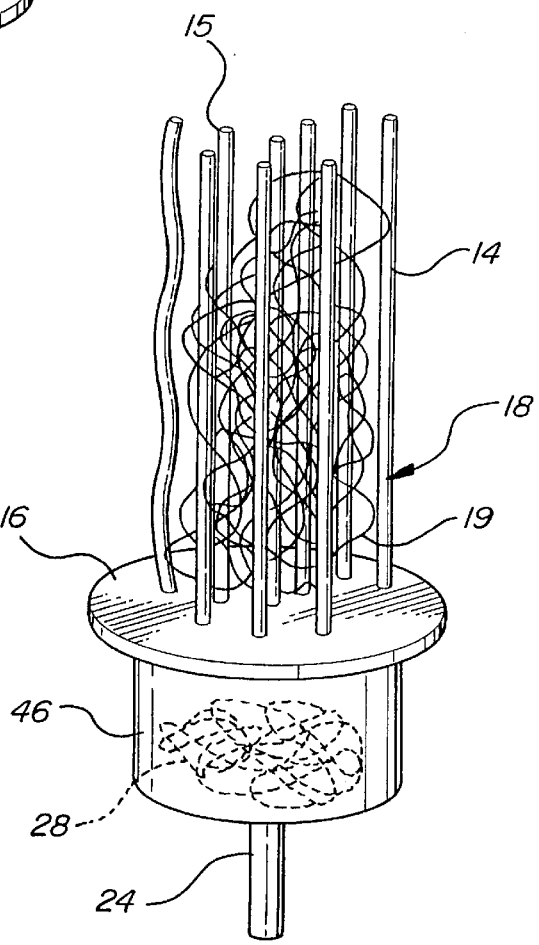

Turbulence producers packing, bends, and cataters as shown in FIG. 1B can minimize the size of this stagnant layer. Use of baffles, protrusions, packing and the like with pressure—outside straight tube modules increase gas-phase mass transfer and improve separation efficiency. This is especially effective when the gas source contains a significant amount of non-permeable, such as carbon monoxide, methane, carbon dioxide, or water.

The only major disadvantage of the small diameter design is that axial pressure drops can become unacceptably high for any reasonable length of tube. This is the reason for specifying a minimum tube diameter for the tubes 14 of the present invention, and for distributing the axial flow among a plurality of tubes 14 or channels thereby allowing shorter tubes and thereby limiting the amount of fluid flow per tube or channel.

For ceramic based tubes the optional diameters can be as large as 3" or even larger if packing or catheters, such as shown in FIG. 2B or a well-chosen flow channel is used. A particularly useful flow channel in this regard is a small annulus, approximately 0.12 to 0.10 inches thick or an annulus containing bumps, protrusions, catalysts beads, baffles, or other turbulence generating means. This annulus allows the large membrane to have the same good transport characteristics as described above. Large diameter membranes are feasible with ceramic based membranes because the substrate costs are low while the permeance tends to be high. The key feature of such a module is that there should be packing or the distance between the membrane and the catheter, or module housing (FIG. 1) should be 0.010 inches to 0.120 inches.

The tubes 14 are arranged axially and are closely spaced within the pressure vessel 12. The small diameter of the tubes 14 coupled with the permeation barrier or wall thickness set forth above provide a tube 14 which is capable of withstanding internal and/or external pressure without collapsing or crushing under the force of the pressure.

The membrane 14 is capable of extracting hydrogen from a fluid stream containing hydrogen. The membrane 14 utilized in the apparatus 5 of the present invention can include any suitable hydrogen extraction membranes known to those skilled in the art. For example, the composite metal membrane disclosed in U.S. Pat. No. 5,215,729, issued Jun. 1, 1993, to the inventor of the present invention and incorporated herein by reference, can be utilized as the membrane in the present invention. However, as stated above, the composite metal membrane disclosed in the '729 patent is provided merely as an example and is in no way intended to be limiting to the types of membranes which can be utilized in accordance with the assembly 5 of the present invention.

For example, the axially disposed tubes 14 can be made of alladium-alloys having the composition between Pd-20% Ag and Pd-50% Ag, Pd 40% Cu, Pd-10% Pt or other similar classes of Pd based alloys well known to those skilled in the art. The tubes 14 can also be constructed of a porous metal or ceramic or polymeric material with either a very small pore separation barrier or coated with palladium or Silica to increase selectivity. The membranes can also include palladium coated polymeric membranes.

As stated above in the '729 Patent, the tubes can also be Pd-coated refractory metal tubes. Additionally, the membrane 14 can include a platinum on palladium black coating to improve both flux and catalytic ability of the membrane 14 by increasing the surface area of the membrane 14. The membrane 14 can further include platinum alloy coatings.

Figure 3A:
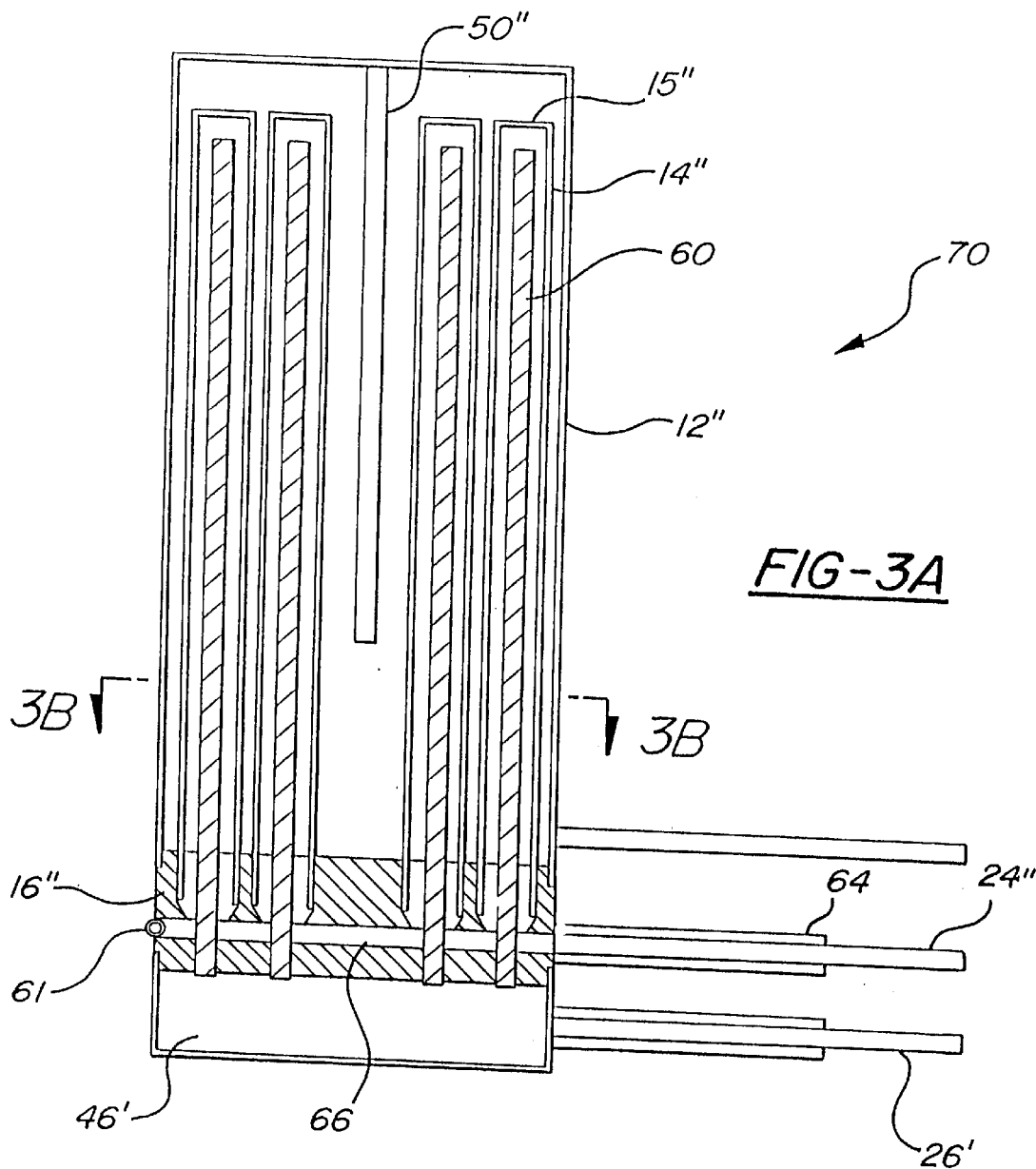
FIG. 3 is a schematic cross sectional view of an apparatus including a plurality of membranes constructed in accordance with the present invention.
Figure 3B:
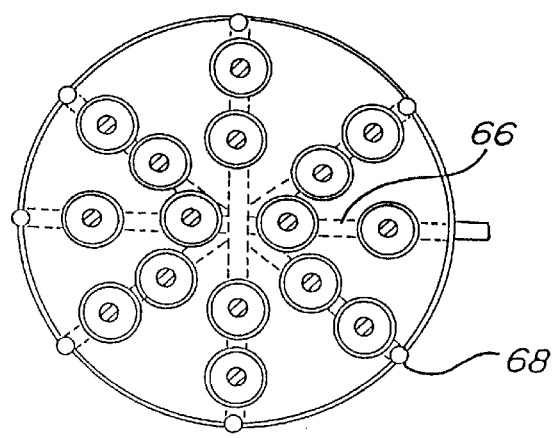

A module containing an alternative membrane is shown generally at 110 in FIG. 3. The Figure schematically shows an outer shell 112 containing a plurality of membranes generally indicated at 114. The membranes 114 are in the form of tubes. A portion of a tube is shown in cross section in FIG. 4. The tubes are held within the shell attachment to a header sheet. The means of attachment of tubes to a header sheet and of header sheet to shell is well known by those versed in the art of palladium-based hydrogen purifiers or of heat exchanger construction, (see e.g. U.S. Pat. No. 4,313, 013 to Harris).

The membrane 114 is capable of extracting hydrogen from a fluid stream containing hydrogen. The membrane 114 generally includes a first layer 115 of Pd—Ag or Pd—Cu alloy or combination thereof, such as Pd—Cu—Ag, which is permeable to hydrogen, the first layer 115 having a first outer surface 118 and an inner surface 120. The alloys can broadly range from 30 wt. % to 95 wt. % Pd. Typically, the Pd content ranges from 60 wt. % to 77 wt. %.

The Pd alloys of the first layer 115 are chosen for high hydrogen permeability in combination with good strength, low cost, ease of fabrication, low embrittlement, good swelling, and good durability characteristics in the presence of hydrogen and its admixtures. Pd—Ag alloys are desirable because they are relatively available, and are easier to fabricate than refractory metal substrates. They are also resistant to oxidation carbiding, and nitride formation, are fairly resistant to embrittlement and cracking, and are well accepted for use in the electronic gas industry.

A second layer 122 is coated preferably by a wet chemical method (electrolytic or electroless plating) over the first surface 118 and attached to the first layer 115, the second layer consisting essentially of palladium, palladium alloys, or platinum. For example, via a suitable method disclosed in Hsu and Buxbaum (1985), examples of palladium alloys are palladium-silver and palladium-gold. Other examples of metals for alloying with palladium for coating the substrate of the present invention can include ruthenium, indium, platinum, copper and rhodium. These alloys are more capable of dissociating hydrogen gas into molecular hydrogen, protecting the substrate from fouling, and operating in membrane-reactor environments. The molecular hydrogen which forms on this surface then permeates through the first layer 115.

An inner third layer 124 consisting essentially of palladium, palladium alloys, or platinum is coated over the inner surface 120 of the membrane. The palladium and platinum can be either smooth Pd or Pt or can be rough Pd or Pt black. Pd or Pt black are advantageous because they provide more catalytic surface area for a given length and diameter of membrane. This inner layer reassociates the hydrogen or alternatively catalyzes a hydrogen oxidation reaction, e.g. reacting the hydrogen with oxygen gas to form water. In either case this coating thereby promotes permeation through the membrane. That is, the second layer 122 dissociates hydrogen molecules in a fluid mixture into dissociated hydrogen molecules or H-atoms.

The hydrogen easily permeates the thin layer 122 or is drawn to cracks within the layer 122 via surface diffusion. The hydrogen is drawn through the membrane 115 following the path of lower free energy. The permeating hydrogen is reassociated into $H_2$ molecules or is oxidized (e.g. to water) on the surface of layer 124. The associated molecules then enter the tube and are carried off.

Alternatively, the direction of hydrogen permeation can be run from inside-out, as opposed to outside-in. That is to say, for example, that hydrogen molecules can diffuse through a membrane tube entering at the inside surface and can be removed at the outside surface.

Unlike prior art, noble metal hydrogen permeating membranes, the surfaces of this embodiment of the present invention have not been oxidized or reduced, quenched, or otherwise "treated". Instead there is a new layer of catalytic material deposited directly over the substrate. Another difference is that the substrate is no longer chosen for its hydrogen dissociation/recombination properties and, therefore, can be made from lower cost alloys than those currently employed.

The membranes have a thickness of between which is chosen based on the expected pressure and temperature of operation and, for tubular membranes, on the diameter of the tube.

Typically, the thickness of the second and third layers 122, 124 are 0.01 to 20 microns; for design of membranes based on most of the alloys above.

The layers 122, 124 perform two functions. First, as stated above, the palladium, or less likely the platinum, are good dissociation catalysts of hydrogen gas or hydrogen rich molecules to atomic hydrogen. The atomic hydrogen then diffuses through the layers 115, 122 and 124. The layers 122, 124 further protect the base metal from poisons such as carbon, oxygen, nitrogen, and sulfur. Thusly, the layers 122, 124 can be said to react with the first layer 115 to make the surface thereof more permeable. Thusly, the present invention provides membranes having a first layer 115, with sufficient strength for the membranes to be made at a desired thinness but further having sufficient hydrogen permeability such that the membranes can be made at a thickness capable of withstanding commercially applied pressures.

The tubes 14 of the present invention can further include periodic crookedness, protrusions 18 or can be interspersed with a packing or mesh 19, or other types of features which can be disposed on either the internal and/or external surfaces of the tube 14,14' so as to cause turbulence or break up the flow of fluid over the membrane tubes 14 to cause greater contact of the source fluid with the extraction membrane 14.

The optional internal passageway 13 allows for preheating the fluid stream and as a means to improve temperature uniformity in the fluid. A thermocouple (not shown) can be disposed in a thermocouple well 36 and used in combination with a heater (not shown) to heat the fluid stream. The hollow space, 46 can contain an additional sorber material 28 to increase the purity of the already purified gas by extracting remaining impurities before the gas exits at 24. This packing also provides some protection from membrane fouling during system upsets. Membrane poisons can be carried into the module by gases that back flow through the membrane. A classic case of this is Arsine poisoning of palladium silver membranes during back flow incidents during the manufacture of semiconductors. Typical sorbent materials for ultra purification of hydrogen can include niobium, vanadium, zirconium, or titanium in the form of wire or rough-mesh granules.

Referring to FIGS. 2A, and 2B, two "pressure-inside" embodiments of the present invention are shown. In these embodiments, the features that are the same as in the first embodiment are identified with the same numerals having a prime, and the features which are new are identified as such.

As briefly stated above and referring to FIG. 2A, one end of the tubes 14' can be mounted in a floating head 52 to allow for expansion/contraction of the tubes 14' under the influences of heat, pressure, and hydrogen absorption in a "pressure-inside" embodiment. The ends of the tube 14' are shown attached to a fixed member 54 of the floating head assembly 52 by methods known to those skilled in the art. The floating head 52 moves within a cavity 56 defined by the vessel 12'. In this relationship, as the tubes 14' expand or contract, the floating member 52 moves within the vessel 12' thereby allowing for expansion and/or contraction of the tubes 14'.

The tubes 14' penetrate a top sheet 54 of the floating head 52 and are fixed to the floating head 52 where otherwise the floating head 52 is sealed. Thus, when the impure gas flow reaches ends of the tubes 14', the gas remains pressurized within the empty space, 58, and is returned up other tubes 14' attached to the floating head assembly 52. Thus the gas is not allowed to escape to the exterior, except for that hydrogen which diffuses through the tube walls.

At the end of the tubes 14' opposite the end attached to the floating head 52, the tubes 14' are attached to a divided fixed head 42. This fixed head 42 allows the fluid mixture to enter via the inlet 22' and to be distributed to the tubes 14' via a distribution section 44 (shown here as the center of the fixed head 42). The fixed head 42 also collects the raffinate in a section 46' so that it exits through outlet 26'.

The fixed head assembly 42 can include a cartridge heater 48 used to control the temperature of the assembly 40. The fixed head assembly 42 can further include a thermocouple disposed in a well 50. The use of the floating-head assembly 52 allows for pressure to be maintained on the inside of the tubes 14' rather than on the outside of the tubes as is the case in the embodiment utilizing only capped ends on the tubes 14' as shown in FIG. 1. As with the first embodiment of the apparatus 5, the tubes 14' can be sealed to the top sheet 54 e.g. by braze, glue, solder, or high temperature cement or adhesive.

In an alternative embodiment of the apparatus, shown in FIG. 2B, the tubes 14" are independently capped as in FIGS. 1A and 1B. The cap is indicated as 15" but the flow is maintained on the inside of the thimbles by means of interior catheters 60. There is a fixed head 16" but the flow within it is complex as described below. Gas enters from the inlet 22" and flows through an optional heating section 64. The flow is distributed through a series of distribution channels 66 within the fixed head 16". These channels distribute the gas to the inside of the tubes 14". Hydrogen permeates through the tube walls and is collected within the region surrounded by the shell 12". The pure hydrogen exits at outlet 24". The impure gas can not exit the tubes at the tube tops because of the caps 15". The impure gas returns down the catheter tubes 60 and is collected in a region below the fixed head 46".

The gas collected at 46" contains concentrated impurities as well as some hydrogen and exits at outlet 26". Seals 61 are disposed about the distribution channels 66" to allow easy manufacture, and a thermocouple wall, 50", is shown for temperature regulation. Temperature measured by the thermocouple placed at 50", is used to control the heater 64. There can also be an additional support frame (not shown) within the shell 12" to aid manufacture and keep the tubes from rattling. As with the pressure outside design in FIG. 1, there can be an additional sorber material (not shown) in the empty space of 46" to sorb out any remaining impurities before the gas exits.

For tubes constructed of materials where expansion and contraction are not serious concerns, the "pressure-inside" design can be fabricated with two fixed heads disposed at opposite ends of the axial tubes. This design is not shown but will be readily comprehended when read in light of the present invention.

There are various uses for the hydrogen extraction modules 40 and 70 constructed in accordance with the present invention. For example, the apparatus can be used as a hydrogen extractor for removing hydrogen from refinery gas streams such as cat-cracker off gas, hydrodesulfurization gas or process gas mixes of carbon monoxide, hydrogen water and carbon dioxide. Alternately it can be used to provide ultrapure hydrogen for analytic (e.g. gas chromatographic) use or electronic manufacture. Alternately this invention can be used to adjust the ratio of hydrogen and carbon monoxide from synthesis gas in Methanol or related chemical synthesis.

The packing described previously can be catalytic (e.g. catalyst pellets or Pt Mesh). This embodiment of the present invention can be used when removing hydrogen from mixtures of alkanes and alkenes, or for the reforming of methanol water mixtures. Adding a catalytic packing makes these modules in to membrane reactors and so favors alkene and hydrogen production. For example, this process can be used in the production of butene from butane; an initial butene—forming reactor could be followed by a membrane reactor made according to the present design. Butene production would be enhanced, and the hydrogen gas would be extracted through the membranes for use elsewhere.

These modules can also be used as a hydrogen extractor for the removal of radio-active hydrogen isotopes from nuclear reactor streams. For this use, it may be advisable to employ a membrane that is coated with palladium on only a single side. This is because many important nuclear reactor streams (e.g., liquid metals) are reactive to palladium.

The module designs listed above could also be beneficial for purification of other gases (e.g. helium or arsene) if the appropriate membrane is used. Thus, for example an array of small-diameter silica membranes could be packaged in a catheter-inside module as shown in FIG. 2B for use in helium purification.

As a hydrogen extractor, the present invention can be used for ultra-purifying cylinder or electrolysis derived hydrogen for use, for example, in electronics manufacture or gas chromatography. Also as a hydrogen extractor it can be used for removing hydrogen from mixtures of alkanes and alkenes, so as to favor alkene production. For example, this process can be used in the production of butene from butane; hydrogen gas would be extracted at intermediate stages in a furnace—reactor—furnace—reactor etc. train, the hydrogen being available for use elsewhere.

In a similar respect, the membrane can take advantage of the differences in diffusivities and permeabilities of the various hydrogen isotopes, especially at low temperature. Thus, as a hydrogen extractor, the membranes of the present invention can be used to separate different hydrogen isotopes from others as well as from non-hydrogen components.

As a membrane reactor, the present invention can be used for removing hydrogen during the production of alkenes from alkanes. For example, the present invention can be used for making butene from butane by shifting the equilibrium within the reaction chamber. This case would be like the reactor furnace extractor train mentioned previously, but condensed into a single process membrane reactor. The endothermisity of the reaction can be aided by adding a diluent, e.g. steam, to the hydrogen extractrate side of the membrane or by the addition of oxygen on the side. The hydrogen that is burned in this way is lost for other uses thereby, but the alkene formation reaction (generally an endothermic reaction) would be heated in situ by the hydrogen oxidation and accordingly, hydrogen pumping, membrane reactor, and furnace costs would be minimized.

Also as a membrane reactor, the present invention can be used for low temperature hydrogen generation from partial combinations of gasoline or from alcohol reforming reactions. It can also be used to enhance the specificity of hydrogenation reaction where hydrogen is extracted from a fluid stream and used to hydrogenate a product. Hydrogenation of a stream containing butadiene and butyne has some commercial potential. The butyne would be preferentially hydrogenated allowing it to be economically extracted as butene and recycled. There are also applications in vitamin and perfume manufacture.

Figure 4:
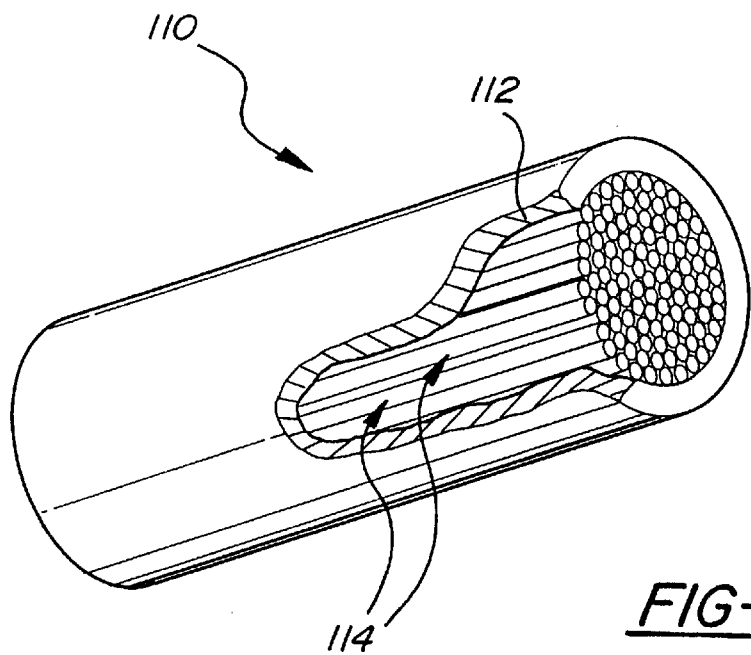
FIG. 4 is a fragmentary cross sectional view of a tubular membrane constructed in accordance with the present invention.
Figure 5:
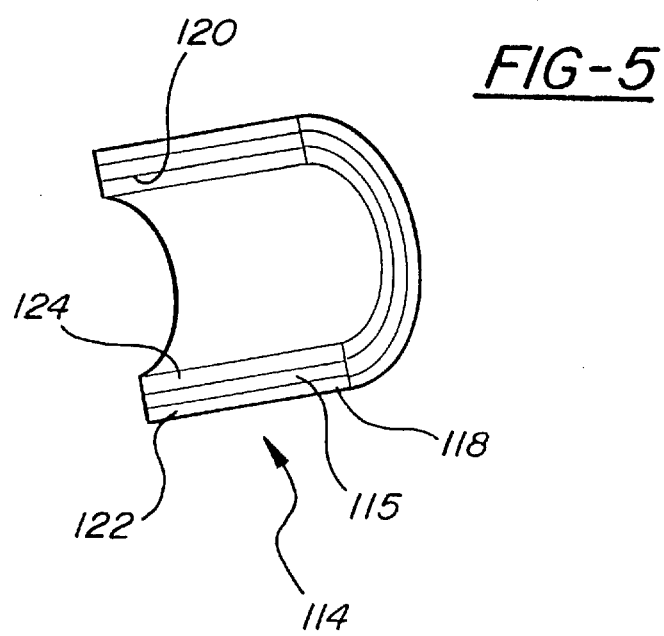
FIG. 5 is a graph showing the permeance of hydrogen through a membrane of the present invention.

The following examples illustrate the utility of the present invention for removing hydrogen from a fluid mixture containing hydrogen whereas coated membranes as shown in FIGS. 3 and 4 are used.

Materials and Methods for Experiment

Sections of Pd-25% Ag tube (3/32"×of 0.0015" wall) were cut. The tubes were coated with palladium grey as per standard electroless procedure.

The sections were assembled in apparatus with a Swagelok cap (available from Cajon Co., Macedonia, Ohio) on one end providing a seal. A Swagelok reducing union with a graphite ferule was applied on the other end.. In later experiments, the Swagelok cap was replaced by a brazed metal cap.

Several volumes of nitrogen were applied at room temperature until most of the air was flushed out. The assembly was then heated to desired temperature approximately 400° C. and H$_2$ was applied to the apparatus. The pressure upstream and downstream of the membrane was measured. The flow of H$_2$ gas through the membrane and the outflow of the purge stream were also measured. The various parameters were calculated.

The membrane was composed of Pd-25% Ag coated with palladium. The surface had a composition of:

|  | After Run | Before Run |
|---|---|---|
| Inside surface | Pd: 97.83 | 99.08 |
|  | Ag: 2.17 | 0.92 |
| Outside | Pd: 97.73 | 93.83 |
|  | Ag: 2.27 | 6.17 |

From the above it appears that, in operation palladium is transferred from the inner to the outer surface of a palladium silver membrane. Thus, one advantage of palladium coating a palladium-silver membrane is that it forstalls palladium depletion on the inner (low hydrogen pressure) side of the membrane. This extends the useful membrane life.

Figure 6:
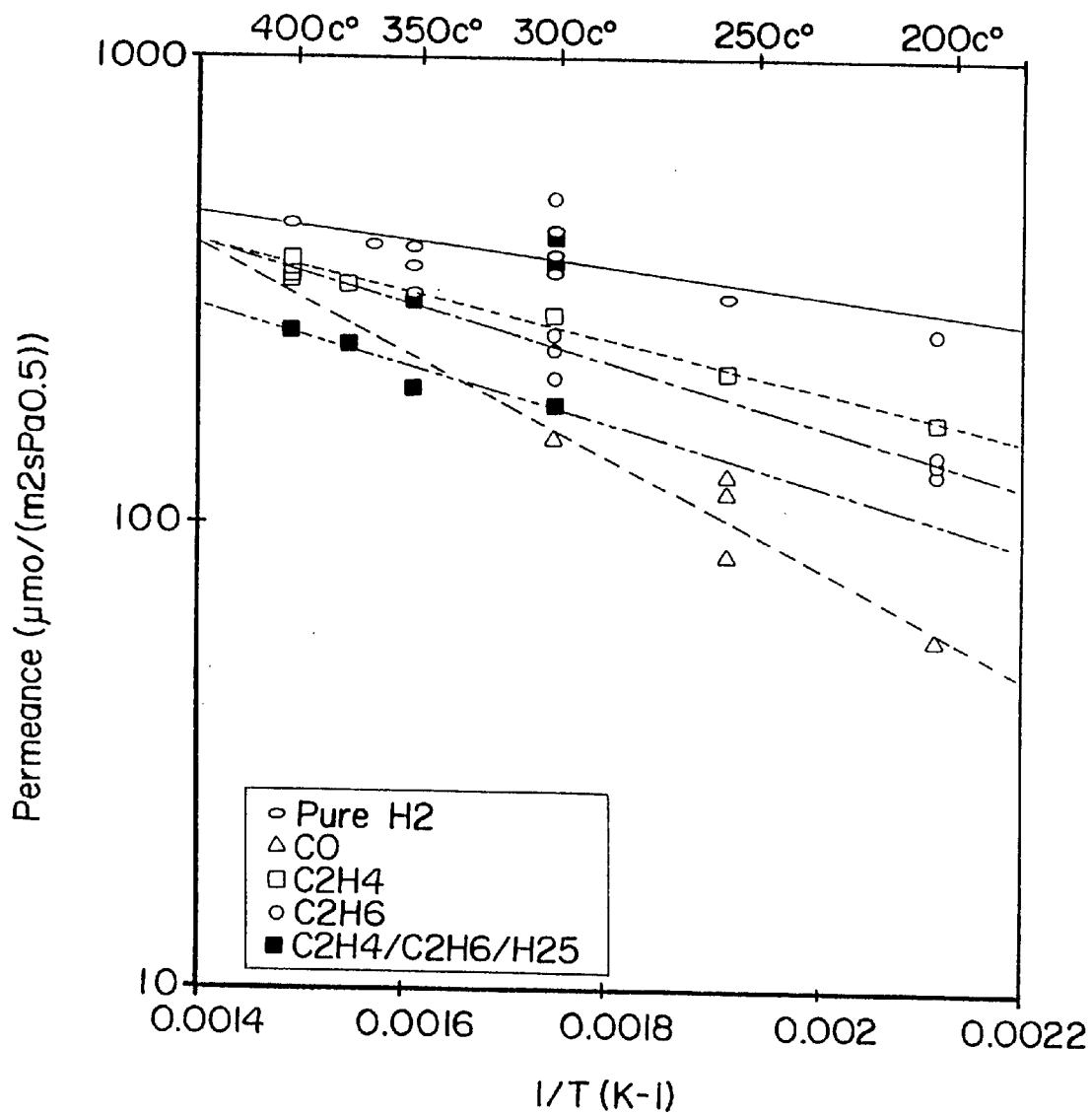
FIG. 6 is a graph showing the permeability of hydrogen through a membrane of the present invention as compared to an uncoated membrane.
Figure 7:
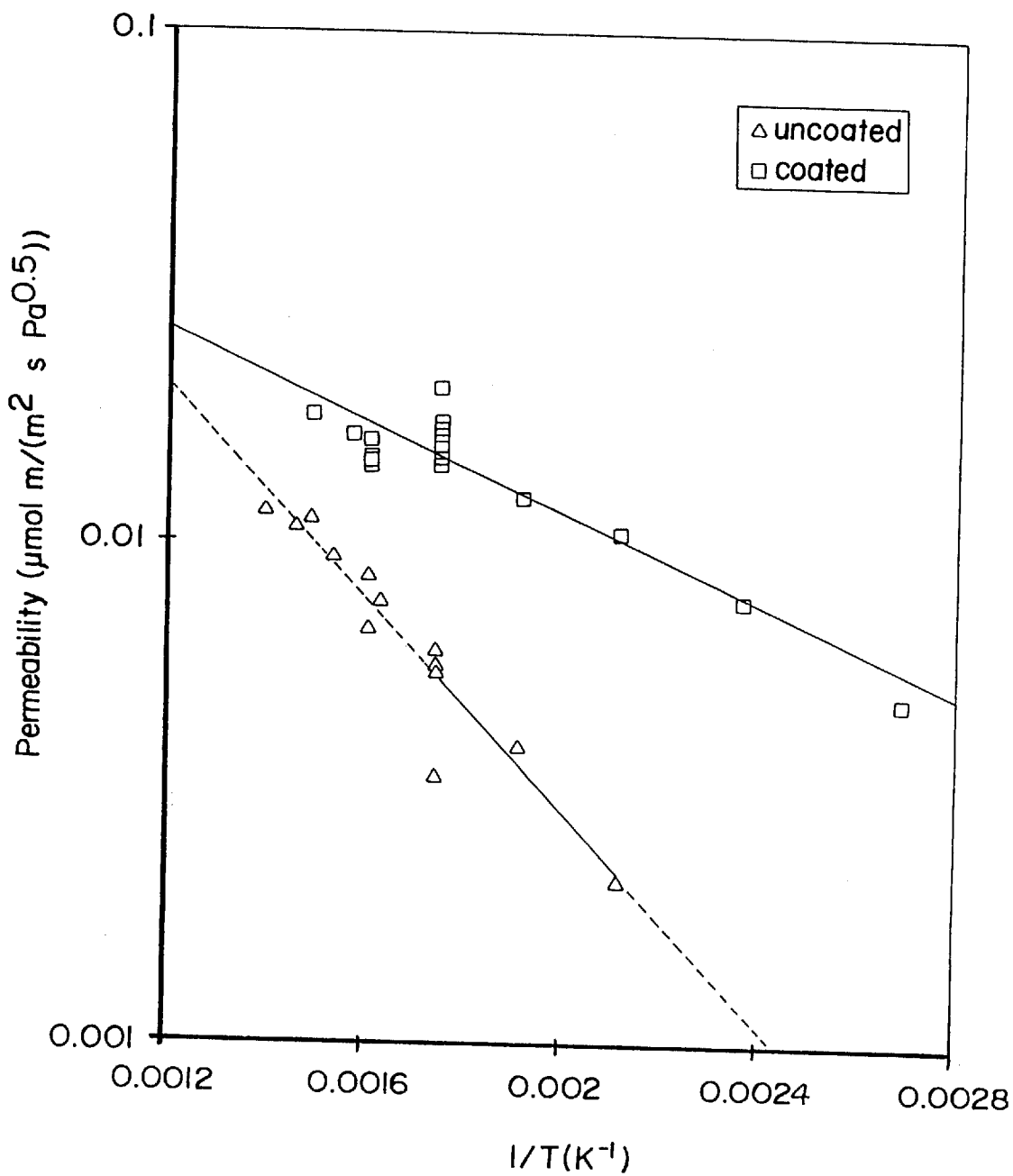

As a control, an uncoated Pd-25% Ag tube was run as per the same procedure and the results comparing the two membranes are shown in FIG. 6. Compared to the uncoated membrane, the coated membrane was far superior at low temperature operation where, apparently, the palladium catalyzes the H$_2$ association/dissociation far better than palladium-silver. Also, the coated membrane was better at resisting poisoning from hydrogen sulfide and ethylene.

The invention has been described in an illustrative manner, and it is to be understood the terminology used is intended to be in the nature of description rather than of limitation.

Obviously, many modifications and variations of the present invention are possible in light of the above teachings. Therefore, it is to be understood that within the scope of the appended claims, reference numerals are merely for convenience and are not to be in any way limiting, the invention may be practiced otherwise than as specifically described.

What is claimed is:

1. A method for improving the mass transfer during hydrogen extraction from a fluid stream, wherein said fluid steam passes adjacent to a plurality of essentially straight, axially aligned tubular hydrogen extraction membranes wherein the improvement lies in:
constructing said hydrogen extraction membrane from a material selected from the group consisting of: metallic, polymeric or ceramic substrate material, wherein said metallic substrate material has a wall thickness of between 0.0001 inches and 0.003 inches and said metallic substrate material has between one and two coatings inclusive thereon, at least one of the coatings comprising a palladium alloy, and said metallic substrate material has an outer diameter such that the ratio of the wall thickness to the outer diameter is between 1:55 and 1:35, and wherein said ceramic and polymeric substrate materials have a wall thickness of between $1\times10^{-6}$ and 0.002 inches and said ceramic and polymeric substrate materials have an outer diameter such that the ratio of wall thickness to the outer diameter is between 1:6000 and 1:30.

2. A method of extracting hydrogen from a stream containing hydrogen, said method comprising the steps of:

dissociating hydrogen gas or hydrogen rich molecules into atomic hydrogen on a first layer of a two layer membrane selected from the group consisting of: palladium, palladium alloy, platinum or platinum alloys;

extracting the dissociated hydrogen from said first layer into and through a second Pd alloy layer; such that said first layer isolates said second; and protecting said second layer from chemical poisons while promoting hydrogen permeation through said second layer.

3. The method as set forth in claim 2 further comprising the step of: reassociating the hydrogen leaving said second layer using a third layer added to said two layer membrane, said third layer being selected from the group consisting of: palladium, palladium alloy, platinum, platinum alloy, and ruthenium.

4. The method as set forth in claim 2 further comprising the step of: reacting the hydrogen leaving said third layer with oxygen or a hydrogen-poor molecule.

5. The method as set forth in claim 2 further comprising the step of: shifting the chemical equilibrium of a catalyzed or uncatalyzed reaction involving hydrogen within a reactor chamber.

6. The method as set forth in claim 2 further comprising the step of: directly forming the hydrogen from electrolysis on the membrane surface.

7. An apparatus for extracting a gas from a fluid stream comprising:

a housing having an inlet and at least one outlet for allowing fluid flow therethrough; and at least one tube extraction membrane having a first end and a second end and being axially disposed in said housing for extracting said gas from said fluid stream flowing therethrough, said extraction membrane being selected from the group consisting of: metallic, ceramic, and polymeric substrate materials wherein said metallic substrate material is a palladium alloy that has between one and two coatings inclusive attached thereto, and said metallic substrate material has a separation barrier wall thickness of between 0.0001 inches and 0.003 inches and said metallic substrate material has an outer diameter such that the ratio of the wall thickness to the outer diameter is between 1:55 and 1:35, and wherein said ceramic and polymeric substrate materials have a separation barrier wall thickness of between $1\times10^{-6}$ and 0.002 inches and said ceramic and polymeric substrate materials have an outer diameter such that the ratio of the wall thickness to the outer diameter is between 1:6000 and 1:30.

8. The apparatus as set forth in claim 7, further comprising a plurality of said tube extraction membrane.

9. The apparatus as set forth in claim 8, wherein said plurality of tube extraction membranes are essentially straight.

10. The apparatus as set forth in claim 8, wherein said plurality of tube extraction membranes are in a close-packed configuration.

11. The apparatus as set forth in claim 7, wherein said gas is hydrogen.

12. The apparatus as set forth in claim 7 further comprising turbulence generating means for generating turbulence in said fluid stream flowing adjacent to said membrane wherein said fluid stream is gaseous.

13. The apparatus as set forth in claim 12, wherein said turbulence generating means is a plurality of protrusions disposed on said tube extraction membrane.

14. The apparatus as set forth in claim 12 wherein said turbulence generating means is periodic crookedness in said tube extraction membrane between the first and second ends of said tube extraction membrane.

15. The apparatus as set forth in claim 12, wherein said at least one extraction membrane is disposed in an essentially vertical orientation within said housing and said turbulence generating means is selected from the group consisting of: compacted particulate packing, catalyst particulate and catalyst containing pellets, wherein said turbulence generating means is adjacent to said membrane.

16. The apparatus as set forth in claim 7, further comprising a sorbent material capable of purifying said gas, internal to the second end of said tube extraction membrane.

17. The apparatus as set forth in claim 7 wherein said membrane comprises a first layer being permeable to hydrogen and having a first and second surface and a second layer, coated onto either the first or the second surface and said second layer is selected from a group consisting of: palladium, palladium alloys, platinum and platinum alloys.

18. The apparatus of claim 7 wherein the ratio of the wall thickness to the outer diameter of said metallic substrate is between 1:45 and 1:35.

19. The apparatus of claim 7 wherein said extraction membrane is selected from the group consisting of: ceramic and polymeric substrate materials and a coating selected from the group consisting of palladium, palladium alloys, platinum and platinum alloys; and said metallic substrate material is selected from the group consisting of: refractory metals, refractory metal alloys, and porous metals, wherein the coatings consist of palladium alloy and a second layer selected from the group consisting of: palladium alloy, palladium, platinum, platinum alloys and ruthenium.

20. An apparatus for extracting a gas from a fluid stream comprising:

a housing having an inlet and at least one outlet for allowing fluid flow therethrough;

at least one tube extraction membrane having a first end and a second end and being axially disposed in said housing for extracting said gas from said fluid stream flowing therethrough, said extraction membrane being selected from the group consisting of: metallic, ceramic, and polymeric substrate materials wherein said metallic substrate material has a separation barrier wall thickness of between 0.0001 inches and 0.003 inches and said metallic substrate material has an outer diameter such that the ratio of the wall thickness to the outer diameter is between 1:55 and 1:35, and wherein said ceramic and polymeric substrate materials have a separation barrier wall thickness of between $1\times10^{-6}$ and 0.002 inches and said ceramic and polymeric substrate materials have an outer diameter such that the ratio of the wall thickness to the outer diameter is between 1:6000 and 1:30;

a plurality of said tube extraction membranes; and a sealed floating head operatively attached to said tube extraction membranes thereby allowing for expansion and contraction of said membranes within said housing.

21. The apparatus as set forth in claim 20, wherein the first end of each of said membranes is fixedly attached to said floating head.

22. An apparatus for extracting a gas from a fluid stream comprising:

a housing having an inlet and at least one outlet for allowing fluid flow therethrough;

at least one tube extraction membrane having a first end and a second end and being axially disposed in said housing for extracting said gas from said fluid stream flowing therethrough, said extraction membrane being selected from the group consisting of: metallic, ceramic, and polymeric substrate materials wherein said metallic substrate material has a separation barrier wall thickness of between 0.0001 inches and 0.003 inches and said metallic substrate material has an outer diameter such that the ratio of the wall thickness to the outer diameter is between 1:55 and 1:35, and wherein said ceramic and polymeric substrate materials have a separation barrier wall thickness of between $1\times10^{-6}$ and 0.002 inches and said ceramic and polymeric substrate materials have an outer diameter such that the ratio of the wall thickness to the outer diameter is between 1:6000 and 1:30; and turbulence generating means for generating turbulence in said fluid stream flowing adjacent to said membrane wherein said fluid stream is gaseous, wherein said turbulence generating means is selected from a group consisting of: a wire, mesh-like material, and a baffle; said means disposed adjacent to said extraction membrane.

23. A tubular membrane for extracting hydrogen from a fluid stream containing hydrogen, said membrane consisting essentially of:

a first palladium alloy layer being permeable to hydrogen and having a first and second surface; and a material coated onto the first surface so as to form a second layer wherein said material is selected from a group consisting of: palladium, palladium alloys, platinum and platinum alloys.

24. The membrane as set forth in claim 23 wherein said second layer is a uniform continuous coating.

25. The membrane as set forth in claim 23 wherein said second layer is discontinuous or roughened so as to increase surface area.

26. The membrane as set forth in claim 23 wherein said material is coated onto the second surface of said first layer, thereby forming a third layer.

27. The membrane as set forth in claim 26 wherein said second and third layers range from 0.01 to 15 microns in thickness.

28. The membrane as set forth in claim 23 wherein said first layer is an alloy selected from the group consisting of: Pd—Ag, Pd—Cu, and Pd—Cu—Ag.

* * * * *

UNITED STATES PATENT AND TRADEMARK OFFICE
CERTIFICATE OF CORRECTION

PATENT NO. : 5,931,987
DATED : August 3, 1999
INVENTOR(S) : Robert E. Buxbaum

It is certified that error appears in the above-identified patent and that said Letters Patent is hereby corrected as shown below:

Column 2, line 4 - Replace "helixs" with --helixes--.
Column 2, line 57 - Replace "are" with --is--.
Column 2, line 61 - Replace "expensive" with --expense--.
Column 3, line 26 - Replace "was" with --were--.
Column 3, line 29 - Delete "." (second occurrence).
Column 3, line 57 - Replace "consisting" with --consists--.
Column 4, line 21 - Replace "are" with --is--.
Column 5, line 3 - Replace "substrate" with --substrates--.
Column 5, line 4 - Delete "." after "C".
Column 5, line 41 - Insert --,-- after "producers".
Column 5, line 41 - Replace "cateters" with --catheters--.
Column 5, line 64 - Replace "turbulance" with --turbulence--.
Column 7, line 52 - Delete "of between" after "thickness".

Column 9, line 46 - Insert --,-- after "hydrogen".
Column 9, line 59 - Replace "in to" with --into--.

Signed and Sealed this

Twenty-sixth Day of December, 2000

Attest:

Q. TODD DICKINSON

*Attesting Officer*          *Director of Patents and Trademarks*